United States Patent [19]

Takehara et al.

[11] Patent Number: 5,056,812
[45] Date of Patent: Oct. 15, 1991

[54] SUSPENSION SYSTEM FOR A VEHICLE

[75] Inventors: Shin Takehara; Toshiki Morita, both of Higashi-Hiroshima, Japan

[73] Assignee: Mazda Motor Corporation, Hiroshima, Japan

[21] Appl. No.: 523,025

[22] Filed: May 14, 1990

[30] Foreign Application Priority Data

May 17, 1989 [JP] Japan .................. 1-124063

[51] Int. Cl.[5] .................. B60G 11/26; B60G 17/00
[52] U.S. Cl. .................. 280/707; 280/709; 280/840; 364/424.05
[58] Field of Search ............ 280/840, 6.1, 702, 703, 280/709, 707; 307/10.1; 364/424.05; 188/299

[56] References Cited

U.S. PATENT DOCUMENTS

| 4,371,182 | 2/1983 | Brown | 280/6.1 |
| 4,602,805 | 7/1986 | Tanaka et al. | 280/840 |
| 4,853,860 | 8/1989 | Achenbach | 280/707 |
| 4,936,604 | 6/1990 | Kawagoe et al. | 280/840 |

FOREIGN PATENT DOCUMENTS

0114757 8/1984 European Pat. Off. .
0264944 4/1988 European Pat. Off. .
62-96113 5/1987 Japan .
1-95927 4/1989 Japan .

Primary Examiner—Kenneth R. Rice
Attorney, Agent, or Firm—Fleit, Jacobson, Cohn, Price, Holman & Stern

[57] ABSTRACT

A suspension system for a vehicle has cylinder devices, in which suspension characteristics are changed by controlling fluid supply or discharge to or from the cylinder devices. In the suspension system, after sensing a vehicle height displacement, the fluid supply or discharge to or from the cylinder devices is controlled so as to set the vehicle height displacement to a desired value in a vehicle height displacement control. Also, the fluid pressure in the cylinder, devices is sensed, and a warping of the vehicle body is computed, based on sensed pressures. Then, fluid supply or discharge to or from the cylinder devices is controlled so as to suppress the warping of the vehicle body in a warp control. According to predetermined conditions, a warp gain coefficient in a warp control unit is changed, so that the vehicle height displacement control and the warp control are performed optimally.

5 Claims, 8 Drawing Sheets

SUSPENSION SYSTEM FOR A VEHICLE

BACKGROUND OF THE INVENTION

1. Field of the Invention

This invention relates to a suspension system for a vehicle, and in particular, to an active suspension system.

2. Description of the Related Art

A conventional active suspension system is disclosed in, for example, Japanese Patent Publication No. 62-96113, laid open to the public on May 2, 1987, a European Patent Application, laid open to the public on Aug. 1, 1984 under a publication number 0114757 and U.S. Pat. No. 4,371,182, issued on Feb. 1, 1983. In the active suspensions as disclosed in the publications enumerated above, a cylinder device is provided for each vehicle wheel member between a vehicle boby member and a vehicle wheel member. By controlling the fluid supply/discharge to/from the cylinder device, the quantity of fluid in the cylinder device can be changed so that the vehicle suspension characteristics are changed.

In the active suspension system, the fluid pressure of each cylinder device is sensed, and warping of the vehicle body is computed based on the sensed pressures. Then, the fluid supply/discharge to/from the individual cylinder devices is controlled so as to suppress the warping of the vehicle body (hereinafter called warp control).

On the other hand, in the active suspension system, after the vehicle height displacement has been sensed, the fluid supply/discharge to/from the individual cylinder devices is controlled so as to set the vehicle height displacement to a desired value (hereinafter called vehicle height displacement control).

Since the warp control and the vehicle height displacement control are performed independently, both controls should be desirably coordinated.

SUMMARY OF THE INVENTION

An object of the invention is to provide a suspension system for a vehicle whereby a warp control and a vehicle height displacement control are performed optimally.

According to the invention, the above object is achieved by providing a suspension system for a vehicle comprising which comprises a plurality of cylinder devices, each being provided between a vehicle body member and a vehicle wheel member for the vehicle body member. Suspension characteristics are changed by controlling fluid supply/discharge to/from the cylinder devices. Pressure sensor means senses the fluid pressure in the cylinder devices, warp and control means computes warping of the vehicle based on fluid pressure signals from the pressure sensor means and controls the fluid supply/discharge to/from the cylinder devices, based on a warp gain coefficient, so as to suppress the warping of the vehicle. A warp gain coefficient change means changes the warp gain coefficient in the warp control means according to predetermined conditions and changing the fluid supply/discharge to/from the cylinder devices.

DESCRIPTION OF THE PREFERRED EMBODIMENT

Figure 1:
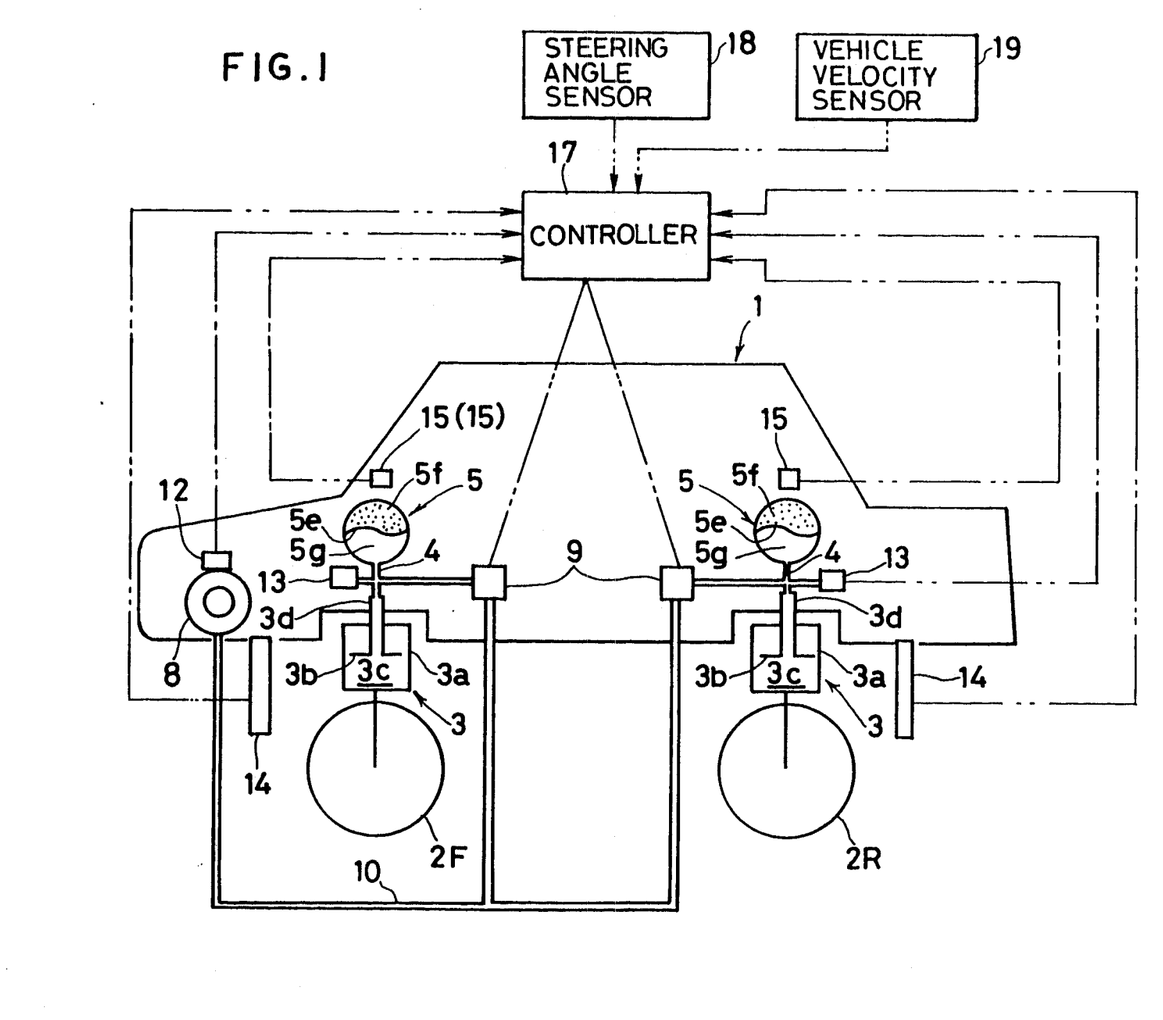
FIG. 1 is an overall schematic view of a vehicle incorporating the suspension system of the present invention.

FIG. 1 is an overall schematic view of a vehicle according to the invention. In FIG. 1, numeral 1 designates a vehicle body member or a vehicle body, and 2F and 2R respectively designate front and rear vehicle wheel members. Between vehicle body 1 and front wheels 2F, and between vehicle body 1 and rear wheels 2R are provided hydraulic cylinder 3, 3. A piston 3b inserted into each cylinder body 3a defines a fluid pressure chamber 3c inside each hydraulic cylinder 3. The upper end portion of a rod 3d connected to the piston 3b is connected to the vehicle body 1, and cylinder bodies 3a, 3a are connected to vehicle wheels 2F, 2R respectively.

A gas spring 5 is connected to the fluid pressure chamber 3c of each hydraulic cylinder 3 through a communicating path 4. Each gas spring 5 is divided into a gas chamber 5f and a fluid pressure chamber 5g by a diaphragm 5e, and the fluid pressure room 5g is connected to the fluid pressure chamber 3c of the hydraulic cylinder 3 through the communicating path 4 and the piston 3b of the hydraulic cylinder 3.

Numeral 8 designates a hydraulic pump, and numerals 9, 9 designate proportional flow control valves connected to the hydraulic pump 8 through a fluid pressure path 10. These valves function to control fluid supply/discharge to/from the hydraulic cylinders 3, 3.

Numeral 12 designates a discharge pressure gauge which senses the discharge pressure of the hydraulic pump 8, and numerals 13, 13 designate fluid pressure sensors which sense the fluid pressure of the fluid pressure chamber 3c in the hydraulic cylinders 3, 3. Numerals 14, 14 designate vehicle height sensors which sense the vehicle height displacement (cylinder stroke length), and numerals 15, 15, 15 designate vertical acceleration sensors which sense the vertical acceleration of the vehicle (spring acceleration of the wheels 2F, 2R). One of these vertical acceleration sensors 15, 15, 15 is provided above each of the right and left front wheels 2F within an approximately horizontal plane, and one is provided at the center of the vehicle in the widthwise direction between the rear wheels 2R. Namely, a total of three vertical acceleration sensors are provided.

Numerals 18, 19 designate a steering angle sensor and a vehicle speed sensor, respectively.

The signals from the above mentioned sensors are input to a controller 17 constituted of CPU (central processing unit) and the like, which controls the proportional flow control valves 9, 9 so as to change the suspension characteristics.

Figure 2:
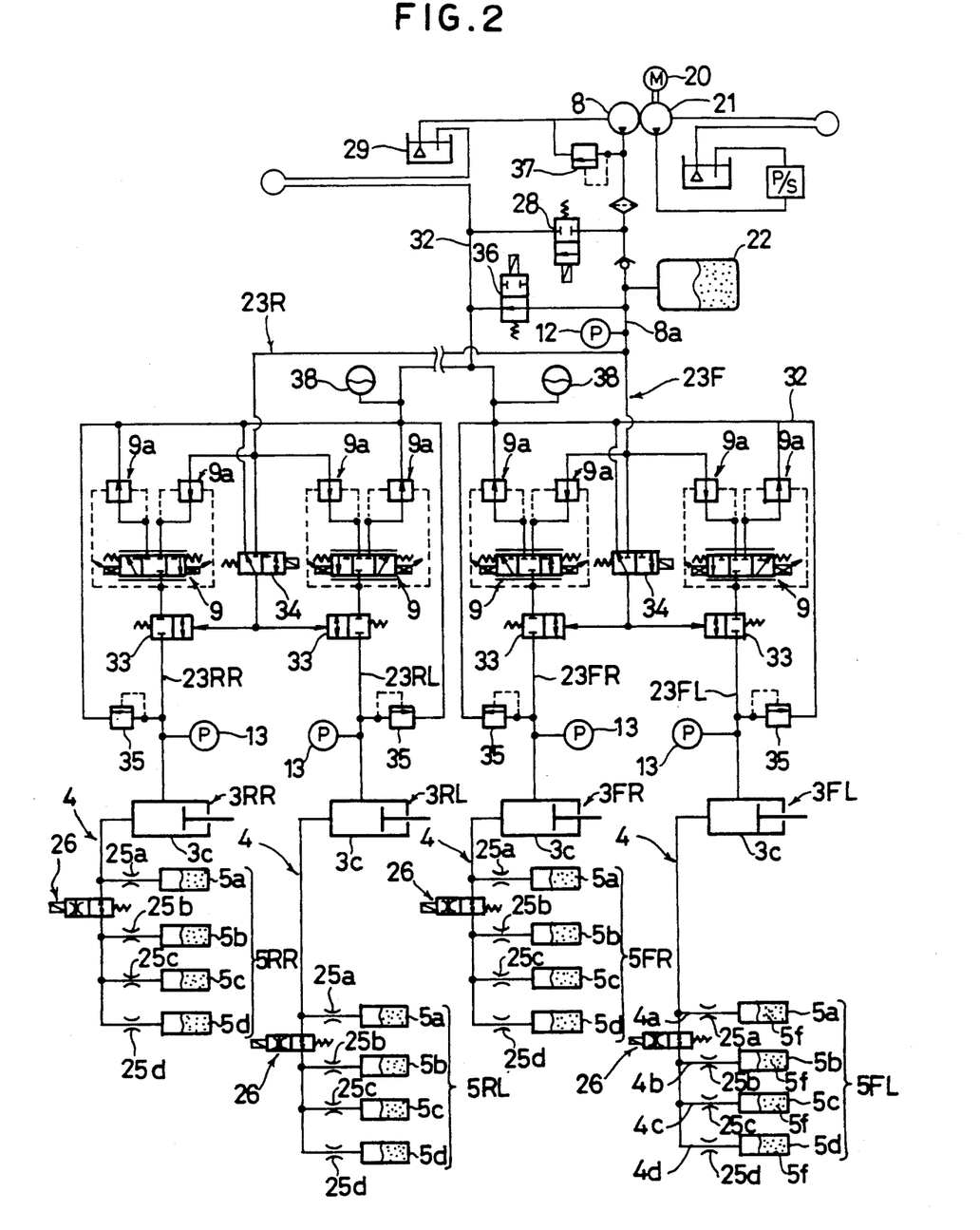
FIG. 2 is a circuit diagram of a hydraulic system for controlling fluid supply/discharge to/from hydraulic cylinder devices.

FIG. 2 shows a hydraulic circuit for supplying and discharging fluid to/from the hydraulic cylinders 3.

As seen in FIG. 2, the hydraulic pump 8 is connected in tandem with a hydraulic pump 21 driven by a driving motor 20 for a power steering device. A discharge tube 8a has an accumulator 22 connected with an intermediate portion thereof and a downstream portion of the discharge tube 8a branches off into a front wheel tube 23F and a rear wheel tube 23R. The front wheel tube 23F branches off into a left front wheel tube 23FL and a right front wheel tube 23FR, the downstream ends of which are connected with the fluid pressure chambers 3c, 3c of the hydraulic cylinders 3FL, 3FR.

In a similar manner, the rear wheel tube 23R branches off into a left wheel tube 23RL and a right wheel tube 23RR, the downstream ends of which are connected with the fluid pressure chambers 3c, 3c of the hydraulic cylinders 3RL, 3RR.

The gas spring devices 5FL through 5RR connected with the hydraulic cylinders 3FL through 3RR each has a plurality (four) of gas springs 5a, 5b, 5c, 5d which are connected through branch communicating paths 4a through 4d to a common communicating path 4 connected with the fluid pressure chamber 3c of the corresponding hydraulic cylinder 3. The branch communicating paths 4a through 4d of the plurality (first through fourth) gas springs 5a through 5d of each wheel have orifices 25a through 25d. The damping action by the orifices 25a through 25d and the buffer action of gas charged in the gas chambers 5f combine to provide the basic function as a suspension system.

In the gas springs 5FL through 5RR of each vehicle wheel, a damping force switching valve 26 which switches the damping force by adjusting the path area of the communicating path 4 is provided on the common communicating path 4 between the first gas spring 5a and the second gas spring gas spring 5b. The switching valve 26 has two positions: an open position (shown in FIG. 2) opening the common communicating path 4 and a throttle position throttling the area of the common communicating path 4.

The discharge tube 8a of the hydraulic pump 8 has an unloader relief valve 28 with an open position and a closed position (shown in FIG. 2) connected near the accumulator 22. When the discharged fluid pressure measured by the discharge pressure gage 12 is more than or equal to a preset upper limit value, the relief valve 28 is switched from the closed position shown in FIG. 2 to the open position, so the fluid in the hydraulic pump 8 is returned directly to a reserve tank 29, whereby the fluid accumulation pressure in the accumulator 22 is controlled to be maintained at a preset value. In above mentioned manner, the accumulated fluid of preset pressure from the accumulator 22 is supplied to the hydraulic cylinders 3.

As the left front wheel, the right front wheel, the left rear wheel and the right rear wheel are identical in their respective configurations, only the left front wheel will be described in the following.

As explained above, the left front wheel tube 23FL is provided with the proportional flow control valve 9 which has three positions: a stopping position closing all ports (shown in FIG. 2), a supplying position where the left front wheel tube 23FL is opened to the supplying side, and a discharge position where the hydraulic cylinder 3 of the left front wheel tube 23FL is connected through a return tube 32. The proportional flow control valve 9 is further provided with pressure-compensated valves 9a, 9a. The pressure-compensated valves 9a, 9a maintain the fluid pressure in the fluid pressure chamber 3c at a preset valve when the proportional flow control valve 9 is positioned at either the supplying position or the discharge position.

On the hydraulic cylinder 3 side portion of the proportional flow control valve 9 is provided a pilot pressure active type switching valve 33 which opens and closes the left front tube 23FL. When a solenoid controlled valve 34, which introduces the pressurized fluid in the left front wheel tube 23F, is at the open position, the fluid pressure of the solenoid controlled valve 34 is introduced as a pilot pressure to the switching valve 34. When the pilot pressure is more than or equal to a predetermined value, the switching valve 33 operates to open the left front wheel tube 23FL, so that the proportional flow control valve 9 can control the flow to the hydraulic cylinder 3.

The numeral 35 designates a relief valve which opens and operates to return fluid in the fluid pressure chamber 3c of the hydraulic cylinder 3 to the return tube 32 when the fluid pressure of the fluid pressure chamber 3c rises abnormally. The numeral 36 designates an ignition switch interlock valve connected near the accumulator 22 on the discharge tube 8a of the hydraulic pump 8. When the ignition switch is at the off position, the interlock valve 36 is controlled to open (shown in FIG. 2) so as to return the fluid in the accumulator 22 to the tank 29 and relieve the high pressure condition of the fluid. The numeral 37 designates a relief valve which returns fluid to the tank 29 and lowers the fluid pressure when the discharge pressure of the hydraulic pump 8 rises abnormally. The numerals 38, 38 designate return accumulators connected to the return tube 32 for accumulating the fluid discharged from the hydraulic cylinder 3.

FIG. 3 is a block diagram illustrating control of suspension characteristics by a controller 17.

FIG. 3 shows a control system A for controlling the vehicle height to a desired value based on vehicle height displacement signals $X_{FR}$, $X_{FL}$, $X_{RR}$, $X_{RL}$ from the vehicle height sensors 14, 14, 14, 14 of the vehicle wheels, a control system B for suppressing vehicle height displacement rates based on the vehicle height displacement rate signals $Y_{FR}$, $Y_{FL}$, $Y_{RR}$, $Y_{RL}$ obtained from the vehicle height displacment signals, a control system C for lowering vertical vibration of the vehicle based on vertical acceleration signals $G_{FR}$, $G_{FL}$, $G_R$ of the three vertical acceleration sensors 15, 15, 15, and a control system D for supressing vehicle body warping computed from pressure signals $P_{FR}$, $P_{FL}$, $P_{RR}$, $P_{RL}$ of the fluid pressure sensors 13, 13, 13, 13 of the vehicle wheels.

Figure 3A:
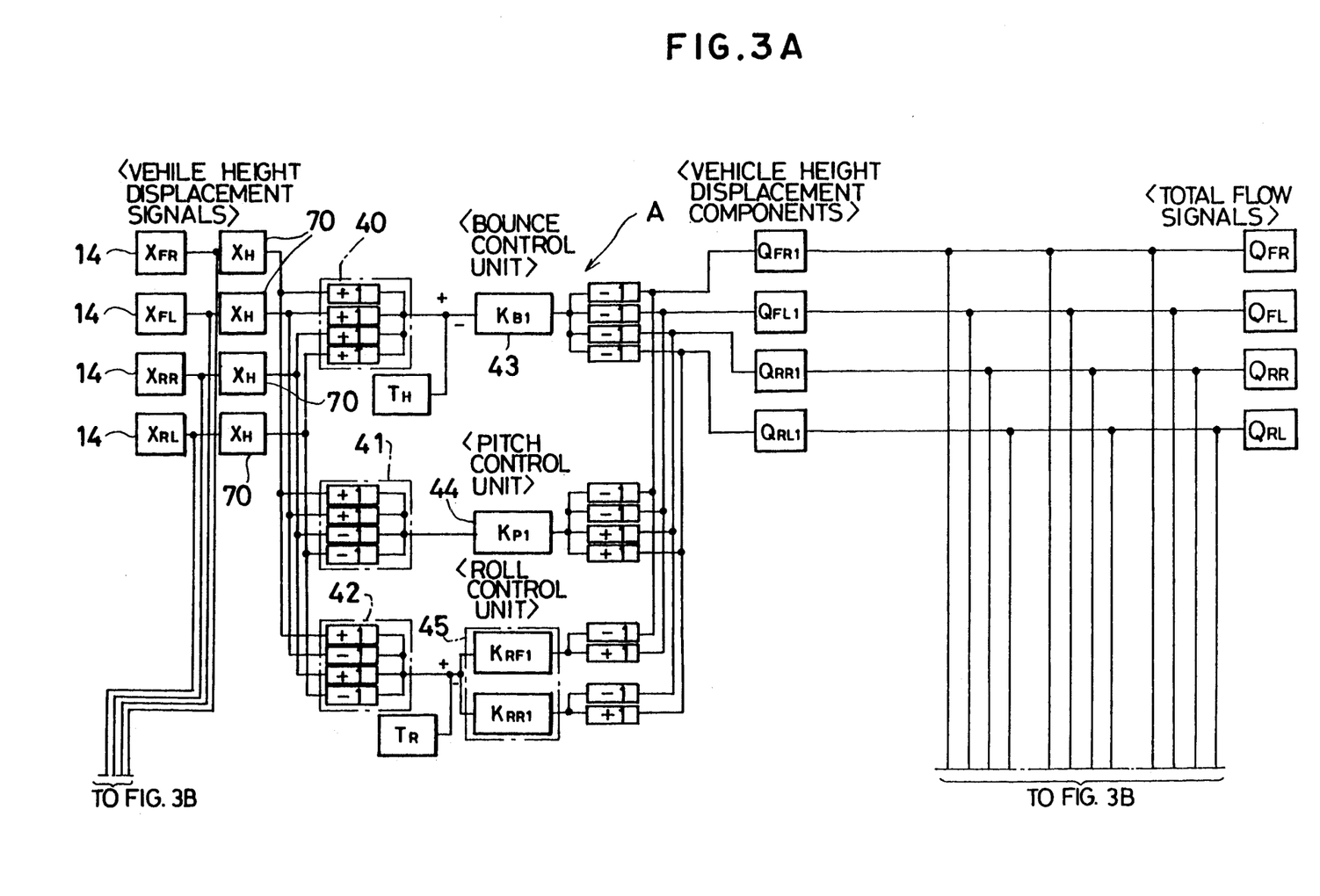
FIGS. 3A through 3D are block diagrams illustrating control of suspension characteristics by a controller.

First, in the control system A, numeral 40 designates a bounce component arithmetic unit which computes the vehicle bounce components by summing not only the outputs $X_{FR}$, $X_{FL}$ of the right and left front wheels 2F but also the outputs $X_{RR}$, $X_{RL}$ of the right and left rear wheels 2R from the vehicle height sensors 14, 14, 14, 14. Numeral 41 designates a pitch component arithmetic unit which computes the vehicle pitch components by subtracting the summed outputs $X_{RR}$, $X_{RL}$ of the right and left rear wheels 2R from summed outputs $X_{FR}$, $X_{FL}$ of the right and left front wheels 2F. Numeral 42 designates a roll component arithmetic unit which computes vehicle roll components by summing the difference $X_{FR} - X_{FL}$ of the outputs of the right and left front wheels 2F and the difference $X_{RR} - X_{RL}$ of the outputs of the right and left rear wheels 2R. Numeral 43 designates a bounce control unit which is input the vehicle bounce component computed in the bounce component arithmetic unit 40 and a desired average vehicle height $T_H$, and which computes controlled variables of the proportional flow control valves 9, 9, 9, 9 based on a gain coefficient $K_{B1}$ under bounce control. Numeral 44 designates a pitch component unit to which is input vehicle pitch components computed in the pitch component arithmetic unit 41 and which computes controlled variables of the proportional flow control valves 9, 9, 9, 9 based on a gain coefficient $K_{P1}$ under pitch control. Numeral 45 designates a roll control unit to which is input vehicle roll components computed in the roll component arithmetic unit 42 and a desired roll displacement $T_R$, and which computes controlled variables of the proportional flow control valves 9, 9, 9, 9 based on gain coefficients $K_{R\,F1}$, $K_{R\,R1}$ under roll control so as to level vehicle height corresponding to the desired roll displacement $T_R$.

For the purpose of controlling vehicle height to the desired value, the controlled variables computed in the above mentioned control units 43, 44, 45 are reversed with respect to the signs of the vehicle height displacement signals of vehicle height sensors 14, 14, 14, 14. After that, each controlled bounce, pitch and roll variables for the vehicle wheels are added and flow signals $Q_{FR\,1}$, $Q_{FL\,1}$, $Q_{RR\,1}$, $Q_{RL\,1}$ of corresponding proportional flow control valves 9, 9, 9, 9 are obtained in the control system A.

Between the vehicle height sensors 14, 14, 14, 14 and the arithmetic units 40, 41, 42 are provided dead zone devices 70, 70, 70, 70, which output their vehicle height displacement signals $X_{FR}$, $X_{FL}$, $X_{RR}$, $X_{RL}$ only when the vehicle height displacement signals $X_{FR}$, $X_{FL}$, $X_{RR}$, $X_{RL}$ from the vehicle height sensors 14, 14, 14, 14 exceed the preset dead zone $X_H$.

Figure 3B:
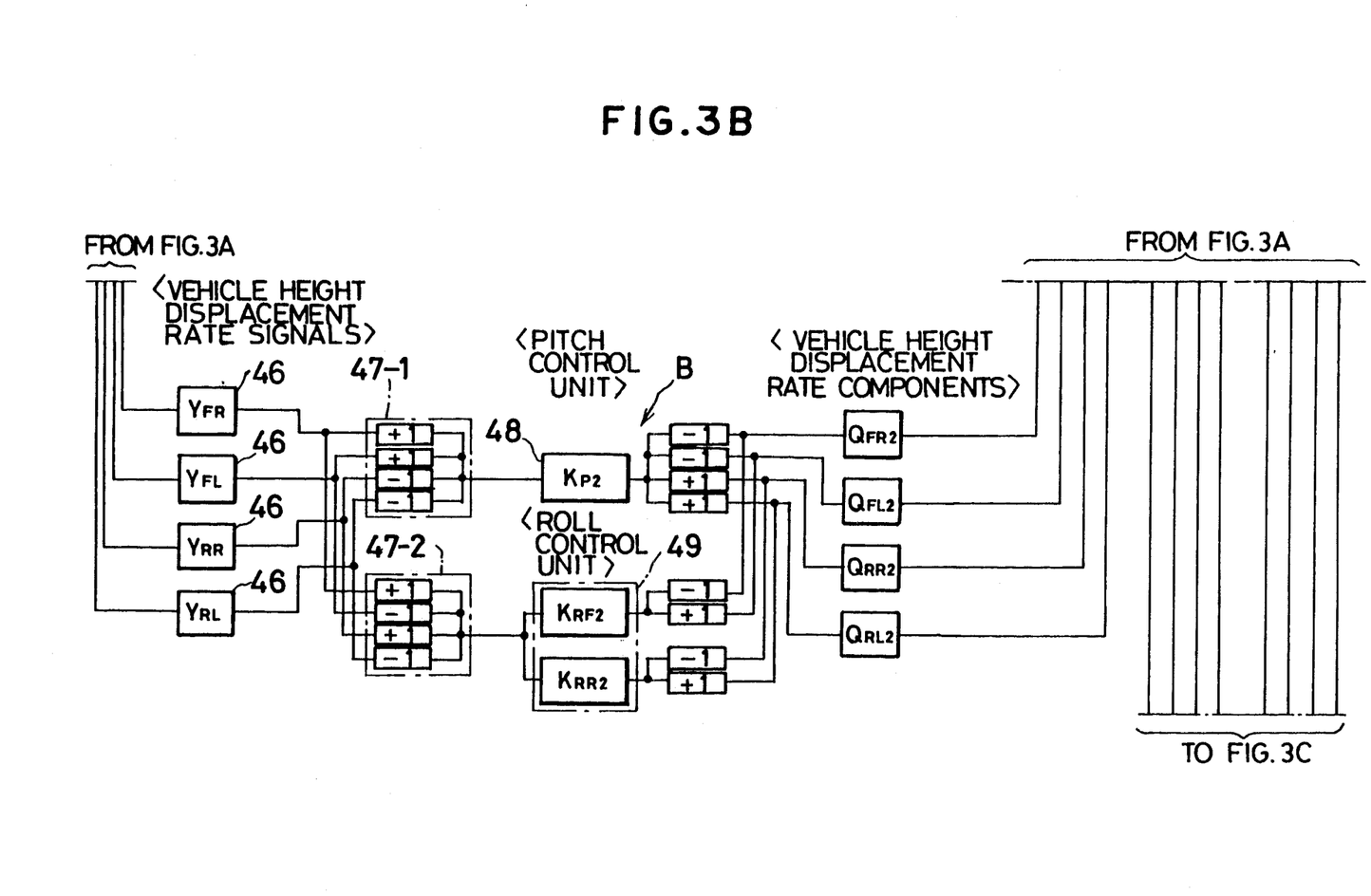

Next in the control system B, vehicle height displacement signals $X_{FR}$, $X_{FL}$, $X_{RR}$, $X_{RL}$ from the vehicle height sensors 14, 14, 14, 14, are input to differentiators 46, 46, 46, 46, by which differential components of the vehicle height displacement signals $X_{FR}$, $X_{FL}$, $X_{RR}$, $X_{RL}$, or vehicle height displacement rate signals $Y_{FR}$, $Y_{FL}$, $Y_{RR}$, $Y_{RL}$ are obtained.

Here, the vehicle height displacement rate is obtained by the following equation.

$$Y = (X_n - X_{n-1})/T$$

$X_n$: vehicle height at time t
$X_{n-1}$: vehicle height at time $t-1$
$T$: sampling time Numeral 47-1 designates a pitch component arithmetic unit which computes the vehicle pitch components by subtracting the summation of the outputs $Y_{RR}$, $Y_{RL}$ of the right and left rear wheels 2R from summation of the outputs $Y_{FR}$, $Y_{FL}$ of the right and left front wheels 2F. Numeral 47-2 designates a roll component arithmetic unit which computes vehicle roll components by summing difference $Y_{FR} - Y_{FL}$ of the outputs of the right and left front wheels 2F and the difference $Y_{RR} - Y_{RL}$ of the outputs of the right and left rear wheels 2R.

Further, numeral 48 designates a pitch control unit to which is input the vehicle pitch component computed in the pitch component arithmetic unit 47-1, and which computes controlled variables for the proportional flow control valves 9, 9, 9, 9 based on a gain coefficient $K_{P2}$ under pitch control. Numeral 49 designates a roll control unit which is input vehicle roll components computed in the roll component arithmetic unit 47-2, and which computes controlled variables for the proportional flow control valves 9, 9, 9, 9 based on gain coefficients $K_{RF2}$, $K_{RR2}$ under roll control.

Thus, each controlled variable computed in the above mentioned control units 48, 49 is reversed with respect to the signs of vehicle height displacement rate signals of the differentiators 46, 46, 46, 46. After that, the controlled pitch and roll variables of the vehicle wheels are added, and flow signals $Q_{FR2}$, $Q_{FL2}$, $Q_{RR2}$, $Q_{RL2}$ for the corresponding proportional flow control valves 9, 9, 9, 9 are obtained in the control system B.

Figure 3C:
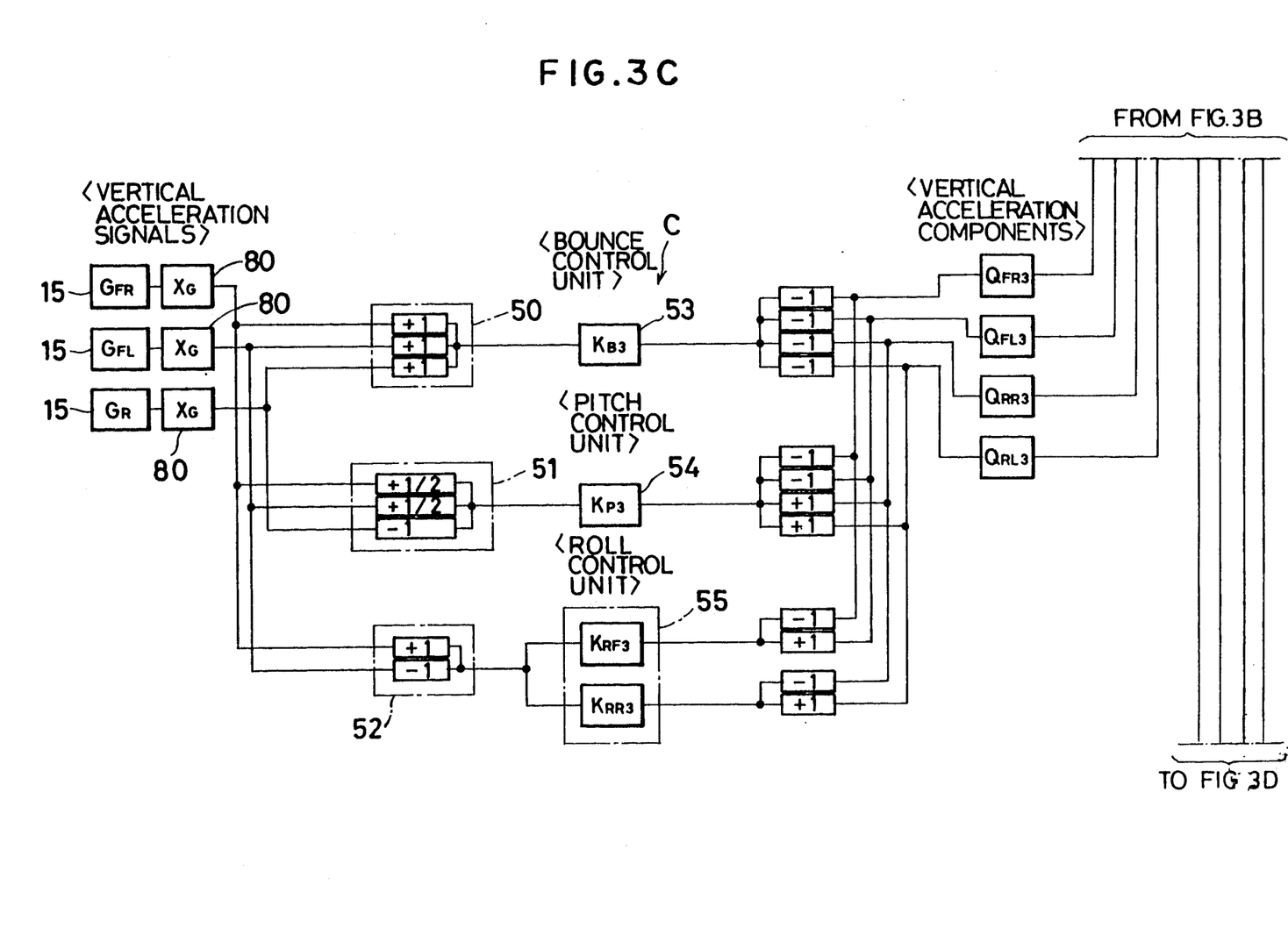

Next in the control system C, numeral 50 designates a bounce component arithmetic unit which computes the vehicle bounce components by summing the outputs $G_{FR}$, $G_{FL}$, $G_R$ of the three vertical acceleration sensors 15, 15, 15. Numeral 51 designates a pitch component arithmetic unit which computes vehicle pitch components by subtracting the output $G_R$ of the rear wheel 2R from the summation of each half-value of outputs $G_{FR}$, $G_{FL}$ of the right and left front wheels 2F in the three vertical acceleration sensors 15, 15, 15. Numeral 52 designates a roll component arithmetic unit which computes vehicle roll components by subtracting the output $G_{FL}$ of the left front wheel from output $G_{FR}$ of the right front wheel.

Further, numeral 53 designates a bounce control unit to which is input vehicle bounce components computed in the bounce component arithmetic unit 50, and which computes controlled variables for the proportional flow control valves 9, 9, 9, 9 of the wheels based on again coefficient $K_{B3}$ under bounce control. Numeral 54 designates a pitch control unit to which is input vehicle pitch components computed in the pitch component arithmetic unit 51, and which computes controlled variables for the proportional flow control valves 9, 9, 9, 9 based on a gain coefficient $K_{P3}$ under pitch control. Numeral 55 designates a roll control unit to which is input vehicle roll components computed in the roll component arithmetic unit 52, and which computes controlled variables for the proportional flow control valves 9, 9, 9, 9 based on gain coefficients $K_{RF3}$, $K_{RR3}$ under roll control.

For the purpose of suppressing vehicle vertical vibration by the bounce components, pitch components and roll components, controlled variables in above mentioned control units 53, 54, 55 are reversed in sign in every wheel, and after that, each controlled bounce, pitch and roll variable in each vehicle wheel is added and flow signals $Q_{FR3}$, $Q_{FL3}$, $Q_{RR3}$, $Q_{RL3}$ for corresponding proportional flow control valves 9, 9, 9, 9 are obtained in the control system C.

Between the vertical acceleration sensors 15, 15, 15 and the arithmetic units 50, 51, 52 are provided dead zone devices 80, 80, 80, which output their vertical acceleration signals $G_{FR}$, $G_{FL}$, $G_R$ only when the vertical acceleration signals $G_{FR}$, $G_{FL}$, $G_R$ from the vertical acceleration sensors 15, 15, 15 exceed preset dead zone $X_G$.

Figure 3D:
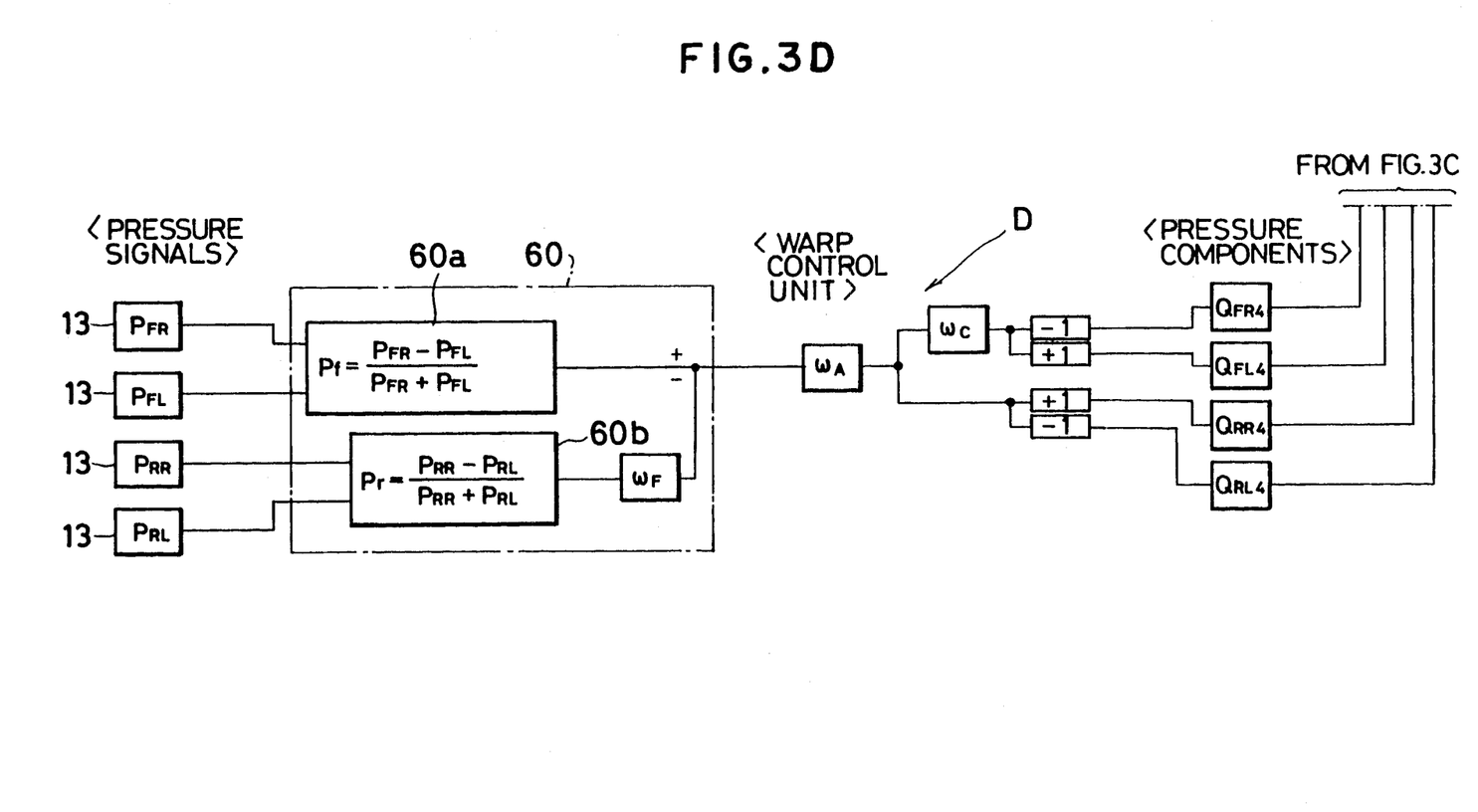

Next in the control system D, a warp control unit 60 includes a fluid pressure ratio arithmetic unit 60a of the front wheel to which is input fluid pressure signals $P_{FR}$, $P_{FL}$ of the two fluid pressure sensors 13, 13 of the front wheels and computes the ratio $(R_{FR} - P_{FL})/(P_{FR} + P_{FL})$ of the right and left front wheel pressure difference $(P_{FR} - P_{FL})$ to the front wheel total fluid pressure $(P_{FR} + P_{FL})$, and a fluid pressure ratio arithmetic unit 60b of the rear wheel which similarily computes the fluid pressure ratio $(P_{RR} - P_{RL})/(P_{RR} + P_{RL})$ of the rear wheel. Then, after the fluid pressure ratio of the rear wheel is multiplied by a gain coefficient $W_F$, the multiplied value is subtracted from the fluid pressure ratio of the front wheel. Thus the subtracted value is multiplied by a gain coefficient $W_A$ and, moreover, is multiplied by a gain coefficient $W_C$ in the front wheel. After that, controlled variables for the wheels are reversed in sign for the purpose of being equalized between right and left wheels, so that flow signals $Q_{FR\,4}$, $Q_{RL\,4}$, $Q_{RR\,4}$, $Q_{RL\,4}$ of corresponding proportional flow control valves 9, 9, 9, 9 are obtained.

Thus, finally, total flow signals $Q_{FR}$, $Q_{FL}$, $Q_{RR}$, $Q_{RL}$ are obtained by summing vehicle height displacement components $Q_{F\,R1}$, $Q_{FL\,1}$, $Q_{R\,R1}$, $Q_{RL\,1}$, vehicle height displacement rate components $Q_{FR\,2}$, $Q_{FL\,2}$, $Q_{RR\,2}$, $Q_{RL\,2}$, vertical acceleration components $Q_{FR\,3}$, $Q_{FL\,3}$, $Q_{RR\,3}$, $Q_{RL\,3}$ and pressure components $Q_{FR\,4}$, $Q_{FL\,4}$, $Q_{RR\,4}$, $Q_{RL\,4}$.

Next, in the vehicle suspension system in accordance with the embodiment of the invention, the warp gain coefficient $W_A$ can be changed in the control system D shown in FIG. 3, according to predetermined conditions, which are described in detail below.

Figure 4:
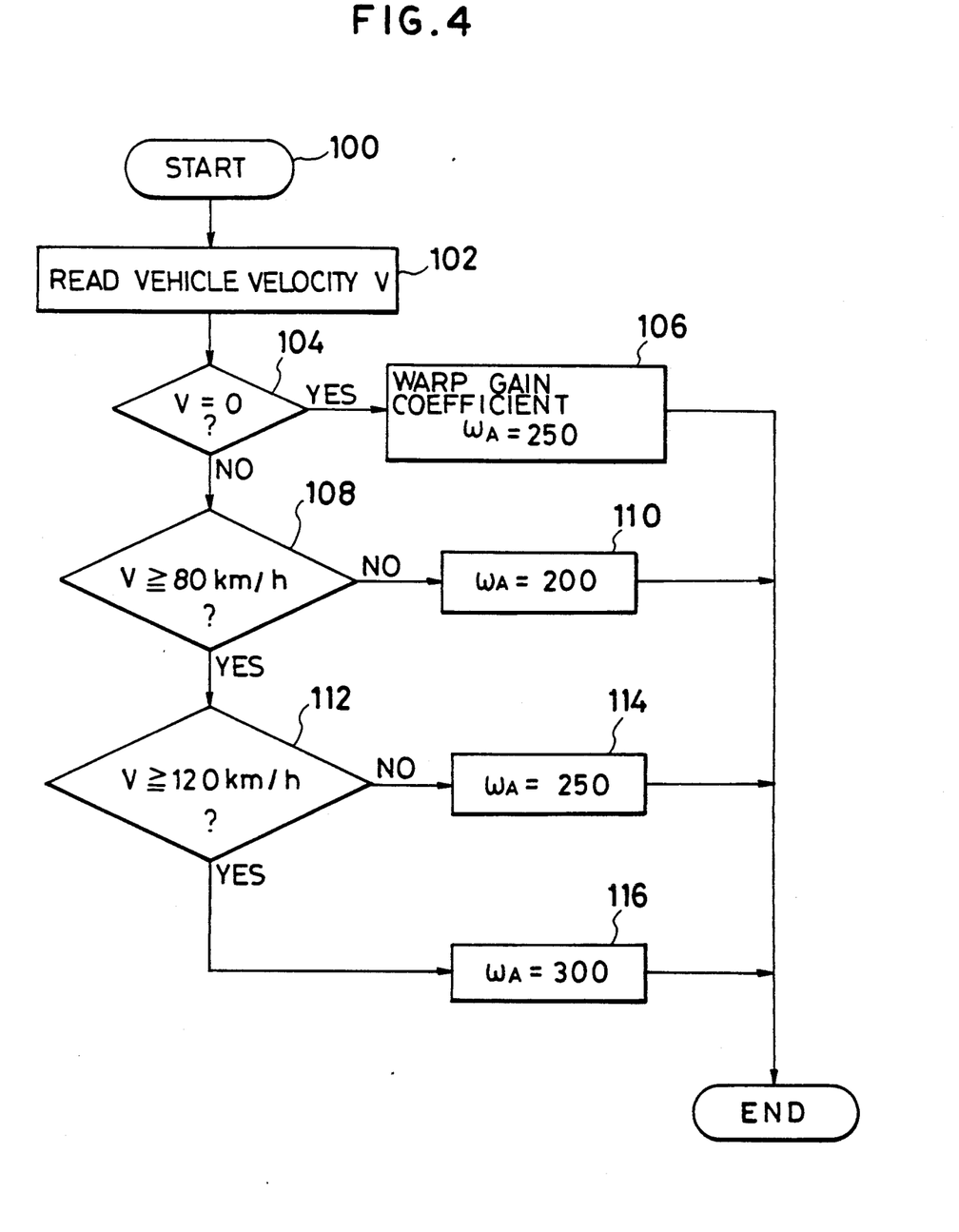
FIG. 4 and FIG. 5 are, respectively, a first flow chart and a second flow chart of the operation of a suspension system for a vehicle according to an embodiment of the invention.

First, FIG. 4 shows a first flow chart of the suspension system for the vehicle in accordance with the embodiment of the invention.

In FIG. 4, the procedure starts in step 100, and the vehicle velocity V is read in step 102. When the vehicle velocity equals zero (V=0: the vehicle is stopped), the procedure advances to step 106, wherein the warp gain coefficient $W_A$ is set to 250 ($W_A$ 250). Namely when the vehicle velocity equals zero (V=0), i.e., the vehicle is stopped, the warp gain coefficient $W_A$ is increased, by which suppression of the vehicle warping (warp control) is given priority.

In step 104, when the vehicle velocity does not equal zero, i.e. the vehicle is running, the procedure advances to step 108 and, when the vehicle velocity is less than 80 km/h (the vehicle is running at a low velocity), further advances to step 110 wherein $W_A$ is set to 200. Namely, because the warping of the vehicle has a little influence on the steering characteristics at a low velocity, the warp gain coefficient $W_A$ is decreased, by which the vehicle height displacement control is given priority, so the desired vehicle height displacement is obtained.

When the vehicle is running at speed of more than or equal to 80 km/h (V≧80 km/h) in step 108 (the vehicle is running at a high speed), the procedure advances to step 112 and, when the vehicle velocity is less than 120 km/h, further advances to step 114 wherein $W_A$ is set to 250. When the vehicle is running at speed of more than or equal to 120 km/h at step 112, the procedure advances to step 116 wherein $W_A$ is to set 300 . Thus the warp coefficient $W_A$ is increased at a high speed, by which warp control is given priority, so the steering characteristics at a high speed is improved.

Figure 5:
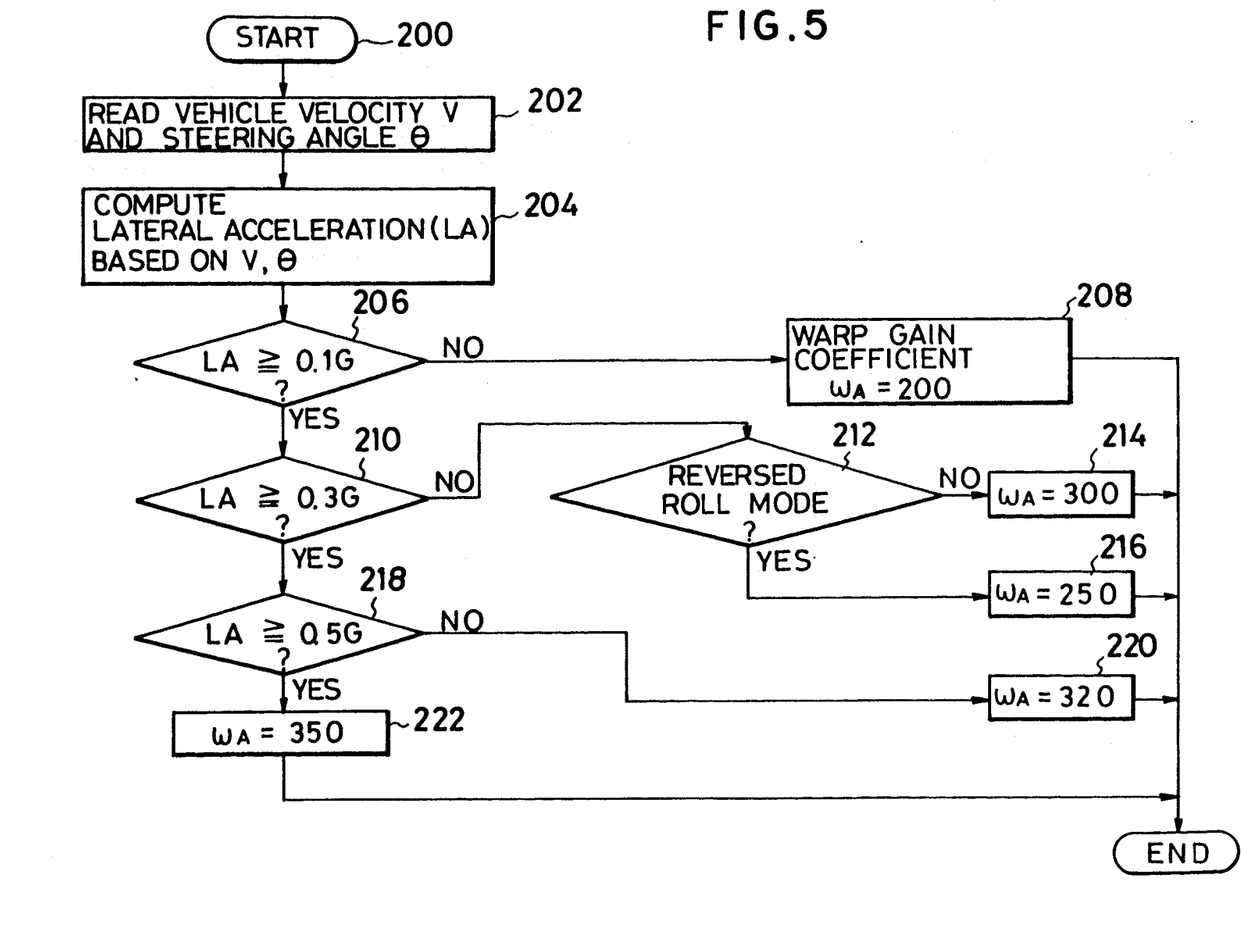

Secondly, FIG. 5 shows a second flow chart of the vehicle suspension system in accordance with the embodiment of the invention.

In FIG. 5, the procedure starts in step 200, and the vehicle velocity V and the steering angle $\theta$ are read in step 202, whereafter the lateral acceleration is computed in step 204. When the lateral acceleration is less than 0.1 G (the vehicle is running straight), the warp gain coefficient $W_A$ is set to 200 in step 206. Thus, because the vehicle warping has a little influence on the steering characteristics under a small lateral acceleration, the warp gain coefficient $W_A$ is decreased, by which the vehicle height displacement control is given priority, so the desired vehicle height displacement is obtained.

When the lateral acceleration is found to be more than or equal to 0.1 G (the vehicle is turning) in step 206, the procedure advances to step 210 wherein, when the lateral acceleration is less than 0.3, the procedure advances to step 212. When, in step 212, the operation is not in a reversed roll mode, the procedure advances to step 214 and the warp gain coefficient $W_A$ is increased to 300. On the other hand, when the operation is in the reversed roll mode, the procedure advances to step 216 and the warp gain coefficient $W_A$ is set to 250. Namely, when the operation is not in the reversed roll mode, the warp gain coefficient $W_A$ is set to 300, so that the warp control is given priority and the steering characteristics are improved. On the other hand, when the operation is in the reversed roll mode, the warp gain coefficient $W_A$ is set to 250, so that the vehicle height displacement control is given priority and the reversed roll mode is achieved.

When the lateral acceleration is more than or equal to 0.3 G in step 210, the procedure advances to step 218 wherein, when the lateral acceleration is less than 0.5 G, the procedure advances to step 220. On the other hand when the lateral acceleration is more than or equal to 0.5 G, the procedure advances to step 222. In the steps 220 and 222, the warp gain coefficient $W_A$ is set to 320 and 350, respectively, and, as the lateral acceleration increases, the warp gain coefficient $W_A$ increases, so that the steering characteristics are improved.

What is claimed is:

1. A suspension system for a vehicle, comprising:
a plurality of cylinder devices, each provided between a vehicle body member and one of a plurality of vehicle wheel members supporting the vehicle body member, suspension characteristics of the suspension system being changed by controlling fluid supply to and fluid discharge from said cylinder devices,
a hydraulic circuit for supplying fluid to and discharging fluid from said cylinder devices,
pressure sensor means for sensing fluid pressure in said cylinder devices, and
a controller for computing warping of said vehicle based on fluid pressure signals from said pressure sensor means and controlling the fluid supply to and fluid discharge from said cylinder devices based on a warp gain coefficient so as to suppress said warping of the vehicle, and for changing said warp gain coefficient according to predetermined conditions, thereby changing the fluid supply to and fluid discharge from said cylinder devices.

2. The suspension system according to claim 1, wherein said controller increases the warp gain coefficient according to an increase in the vehicle velocity.

3. The suspension system according to claim 1, wherein said controller increases the warp gain coefficient according to an increase in a lateral acceleration.

4. The suspension system according to claim 1, wherein said controller increases the warp gain coefficient when the vehicle is stopped.

5. The suspension system according to claim 1, wherein said controller decreases the warp gain coefficient when the vehicle is rolled in a direction opposite to a direction of normal roll operation as compared to when the vehicle is rolled in the direction of normal roll operation.

* * * * *